US012688844B2

(12) United States Patent
Seshadri et al.

(10) Patent No.: US 12,688,844 B2
(45) Date of Patent: Jul. 21, 2026

(54) SYSTEM AND METHOD FOR CONTROLLING NOISE CANCELLATION SYSTEMS IN VEHICLES

(71) Applicant: NXP B.V., Eindhoven (NL)

(72) Inventors: Guruprasad Seshadri, Bangalore (IN); Shreedhar Madan Rao Kamalapurkar, Bengaluru (IN); Dayananda Kuderu Siddarajappa, Bangalore (IN)

(73) Assignee: NXP B.V., Eindhoven (NL)

( * ) Notice: Subject to any disclaimer, the term of this patent is extended or adjusted under 35 U.S.C. 154(b) by 208 days.

(21) Appl. No.: 18/323,765

(22) Filed: May 25, 2023

(65) Prior Publication Data

US 2024/0212663 A1 Jun. 27, 2024

(51) Int. Cl.

*G10K 11/178* (2006.01)
*G07C 5/08* (2006.01)

(52) U.S. Cl.

CPC ...... *G10K 11/17823* (2018.01); *G07C 5/0808* (2013.01); *G10K 11/17825* (2018.01); *G10K 11/17881* (2018.01); *G10K 11/17883* (2018.01); *G10K 2210/12821* (2013.01); *G10K 2210/30231* (2013.01); *G10K 2210/3026* (2013.01); *G10K 2210/3027* (2013.01);
(Continued)

(58) Field of Classification Search

CPC ....... G10K 11/17823; G10K 11/17825; G10K 11/17881; G10K 11/17883; G10K 2210/12821; G10K 2210/3026; G10K 2210/3027; G10K 2210/3028; G10K 2210/30351; G10K 2210/3044; G06N 20/00; G07C 5/0808

USPC ........................................................ 381/71.4
See application file for complete search history.

(56) References Cited

U.S. PATENT DOCUMENTS

| | | | |
|---|---|---|---|
| 8,285,545 | B2 | 10/2012 | Lee et al. |
| 9,311,930 | B2 | 4/2016 | Srinivasan et al. |

(Continued)

FOREIGN PATENT DOCUMENTS

| | | | |
|---|---|---|---|
| CN | 104916289 | A | 9/2015 |
| CN | 107240392 | A | 10/2017 |

(Continued)

OTHER PUBLICATIONS

"Auto decibel database" available at <<https://www.auto-decibel-db.com/index_kmh.html>>, downloaded Dec. 6, 2022.

(Continued)

*Primary Examiner* — Vivian C Chin
*Assistant Examiner* — Douglas J Suthers

(57) ABSTRACT

An adaptive noise classifier and a controller for controlling various noise cancellation systems of a vehicle are provided. The adaptive noise classifier determines a first acoustic state of the vehicle based on audio signals generated by various audio-capturing devices of the vehicle. The controller receives status data indicative of one or more functional attributes of the vehicle. Based on the status data and the first acoustic state, the controller determines a second acoustic state. The second acoustic state is an updated version of the first acoustic state. Based on the second acoustic state, the controller controls an operational state of each noise cancellation system of the vehicle.

20 Claims, 7 Drawing Sheets

(52) U.S. Cl.
CPC ................ *G10K 2210/3028* (2013.01); *G10K 2210/30351* (2013.01); *G10K 2210/3044* (2013.01)

(56) References Cited

U.S. PATENT DOCUMENTS

| | | | | |
|---|---|---|---|---|
| 10,000,152 | B1 * | 6/2018 | Scalea | B60Q 5/006 |
| 10,347,236 | B1 | 7/2019 | Bastyr et al. | |
| 10,770,056 | B1 | 9/2020 | Zaferopoulos | |
| 11,151,865 | B2 | 10/2021 | Meister | |
| 2006/0253282 | A1 | 11/2006 | Schmidt et al. | |
| 2015/0215716 | A1 * | 7/2015 | Srinivasan | G10L 25/51 381/86 |
| 2017/0193975 | A1 | 7/2017 | Butts | |
| 2021/0020024 | A1 * | 1/2021 | Meister | G08B 21/06 |

FOREIGN PATENT DOCUMENTS

| | | | |
|---|---|---|---|
| CN | 112550191 | A | 3/2021 |
| EP | 3875337 | A1 | 9/2021 |
| KR | 20190018798 | A | 2/2019 |

OTHER PUBLICATIONS

"Searching for The World's Quietest Car" available at <<https://www.bksv.com/en/knowledge/blog/sound/quietest-cars>>, downloaded Dec. 6, 2022.

Benesty, J., "A Multidelay Double-Talk Detector Combined with the MDF Adaptive Filter", EURASIP Journal on Advances in Signal Processing, Hindawi Publishing Corporation, Mar. 2003.

Yang, F., "Frequency-Domain Filtered-x LMS Algorithms for Active Noise Control: A Review and New Insights", Applied Sciences, vol. 8, Issue No. 11, pp. 2313, MDPI, Nov. 20, 2018.

* cited by examiner

400

| Second Acoustic State (402a) | State of engine noise cancellation system (402b) | State of road noise cancellation system (402c) | State of active noise cancellation system (402d) |
|---|---|---|---|
| Vehicle moving at reference speed with plurality of windows closed and presence of voice activity therein | OFF | ON | ON |
| Vehicle moving at reference speed with all windows closed and absence of voice activity therein | OFF | ON | OFF |
| Vehicle moving at reference speed with one or more windows open and presence of voice activity therein | OFF | OFF | OFF |
| Vehicle moving at reference speed with one or more windows open and absence of voice activity therein | OFF | OFF | OFF |

FIG. 4

SYSTEM AND METHOD FOR CONTROLLING NOISE CANCELLATION SYSTEMS IN VEHICLES

CROSS-REFERENCE TO RELATED APPLICATIONS

This application claims the priority under 35 U.S.C. § 119 of India application Ser. No. 202221072339, filed on 14 Dec. 2022, the contents of which are incorporated by reference herein.

BACKGROUND

Field of the Disclosure

The present disclosure relates generally to electronic circuits, and, more particularly, to a system and a method for controlling noise cancellation systems in vehicles.

Description of the Related Art

Vehicles are widely used in day-to-day life for commuting, transporting cargo, or the like. Various types of noises are present in a cabin of a vehicle. Examples of such noises include a noise of an engine of the vehicle, a road-tire interaction noise, a wind noise, or the like. Such noises may cause discomfort to the driver and passengers of the vehicle.

BRIEF DESCRIPTION OF THE DRAWINGS

The following detailed description of the embodiments of the present disclosure will be better understood when read in conjunction with the appended drawings. The present disclosure is illustrated by way of example, and not limited by the accompanying figures, in which like references indicate similar elements.

FIG. 4 illustrates a table that describes control of a plurality of noise cancellation systems of the vehicle of FIG. 1 in accordance with an embodiment of the present disclosure;

DETAILED DESCRIPTION OF EMBODIMENTS

Figure 1:
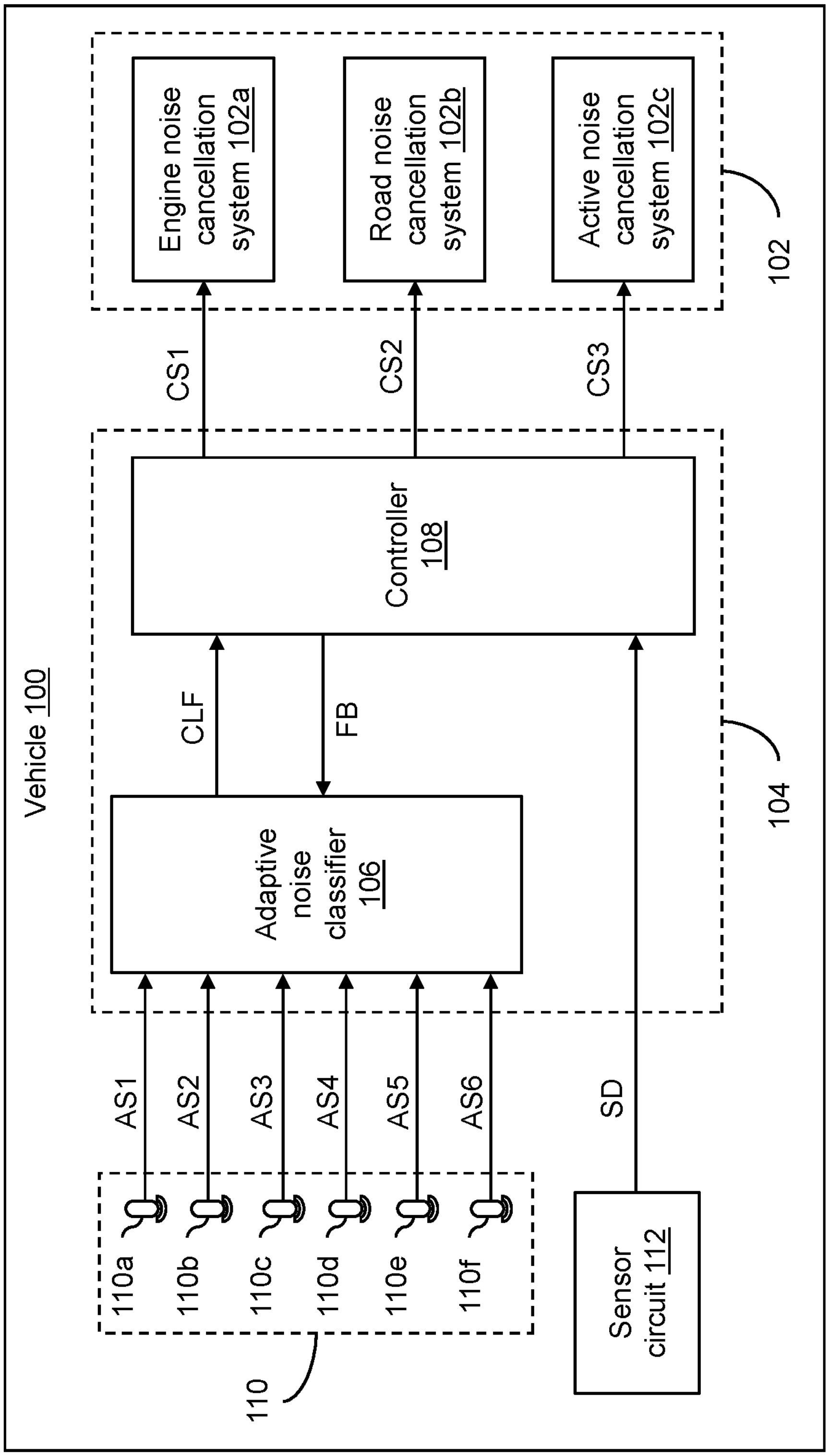
FIG. 1 illustrates a schematic block diagram of components of a vehicle in accordance with an embodiment of the present disclosure.

The detailed description of the appended drawings is intended as a description of the embodiments of the present disclosure and is not intended to represent the only form in which the present disclosure may be practiced. It is to be understood that the same or equivalent functions may be accomplished by different embodiments that are intended to be encompassed within the spirit and scope of the present disclosure.

In an embodiment of the present disclosure, a circuit is disclosed. The circuit may include an adaptive noise classifier and a controller coupled to the adaptive noise classifier. The adaptive noise classifier may be configured to receive a plurality of audio signals from a plurality of audio-capturing devices of a vehicle and determine a first acoustic state of the vehicle based on the plurality of audio signals. The controller may be configured to receive status data indicative of one or more functional attributes of the vehicle and determine a second acoustic state of the vehicle based on the first acoustic state and the status data. The second acoustic state may be an updated version of the first acoustic state. The controller may be further configured to control an operational state of each of a plurality of noise cancellation systems of the vehicle based on the second acoustic state.

In another embodiment of the present disclosure, a vehicle control method is disclosed. The vehicle control method may include receiving a plurality of audio signals from a plurality of audio-capturing devices of a vehicle and determining a first acoustic state of the vehicle based on the plurality of audio signals, by an adaptive noise classifier. Further, the vehicle control method may include receiving status data indicative of one or more functional attributes of the vehicle by a controller. The vehicle control method may further include determining, based on the first acoustic state and the status data, a second acoustic state of the vehicle and controlling an operational state of each of a plurality of noise cancellation systems of the vehicle based on the second acoustic state, by the controller. The second acoustic state may be an updated version of the first acoustic state.

In some embodiments, the one or more functional attributes of the vehicle may include at least one of a group consisting of a speed of the vehicle, a position of a plurality of windows of the vehicle, a status of a voice detector of the vehicle, a tire pressure of a plurality of tires of the vehicle, a revolution count of an engine of the vehicle, and a status of a heating, ventilation, and air conditioning (HVAC) system of the vehicle.

In some embodiments, the first acoustic state may be indicative of a dominant noise associated with the vehicle. The dominant noise may correspond to one of a group consisting of an engine noise of the vehicle, a road-tire interaction noise of the vehicle, and a wind noise in the vehicle.

In some embodiments, the adaptive noise classifier may be further configured to generate classification data that is indicative of the first acoustic state and provide the classification data to the controller. The controller may determine the second acoustic state based on the classification data and the one or more functional attributes of the vehicle.

In some embodiments, the controller may be further configured to validate the first acoustic state based on the status data. The second acoustic state may be further determined based on the validation of the first acoustic state.

In some embodiments, to control the operational state of each of the plurality of noise cancellation systems, the controller may be further configured to generate a plurality of control signals and provide the plurality of control signals to the plurality of noise cancellation systems. Each control signal controls activation and deactivation of a corresponding noise cancellation system.

In some embodiments, the adaptive noise classifier has a training phase and a deployment phase associated therewith. During the training phase, the adaptive noise classifier may be further configured to generate a plurality of model parameters based on a plurality of training signals. During the deployment phase, the adaptive noise classifier may determine the first acoustic state based on the plurality of model parameters and the plurality of audio signals.

In some embodiments, during the training phase, the adaptive noise classifier may be further configured to receive the plurality of training signals, with each training signal being indicative of an audio associated with the vehicle, and extract a first plurality of features from each training signal. The first plurality of features may include at least one of a group consisting of a time period, a measure of periodicity, a spectral envelope, one or more cepstral attributes, and one or more spectral band energy levels associated with the corresponding training signal. The adaptive noise classifier may be further configured to process the first plurality of features of each training signal to generate the plurality of model parameters.

In some embodiments, during the training phase, the adaptive noise classifier may be further configured to initialize the plurality of model parameters to a plurality of predefined values and update the plurality of model parameters in an iterative manner. For each iteration, the adaptive noise classifier may be further configured to generate output data based on the plurality of model parameters and the first plurality of features of each training signal and compare the output data with target data to determine an error associated with the plurality of model parameters. The plurality of model parameters may be updated based on the determined error. The training phase of the adaptive noise classifier is completed when the determined error is below a tolerance limit.

In some embodiments, during the deployment phase, the adaptive noise classifier may be further configured to filter the plurality of audio signals received from the plurality of audio-capturing devices and extract a second plurality of features from each audio signal. The second plurality of features may include at least one of a group consisting of a time period, a measure of periodicity, a spectral envelope, one or more cepstral attributes, and one or more spectral band energy levels associated with the corresponding audio signal. The first acoustic state may be determined based on the second plurality of features of each audio signal and the plurality of model parameters.

In some embodiments, during the deployment phase, the plurality of model parameters may be updated based on the one or more functional attributes of the vehicle.

In some embodiments, the controller may be further configured to generate, based on the first acoustic state and the one or more functional attributes of the vehicle, feedback data indicative of the update of the plurality of model parameters and provide the feedback data to the adaptive noise classifier. The adaptive noise classifier may be further configured to update the plurality of model parameters based on the feedback data.

In some embodiments, the first acoustic state may correspond to one of a group consisting of the vehicle moving with a plurality of windows thereof closed and the vehicle moving with one or more windows, of the plurality of windows, open. The second acoustic state may correspond to one of a group consisting of the vehicle moving at a reference speed with the plurality of windows closed and presence of a voice activity therein, the vehicle moving at the reference speed with the plurality of windows closed and absence of the voice activity therein, the vehicle moving at the reference speed with the one or more windows open and the presence of the voice activity therein, and the vehicle moving at the reference speed with the one or more windows open and the absence of the voice activity therein.

In some embodiments, the plurality of noise cancellation systems may include an engine noise cancellation system for an engine noise of the vehicle, a road noise cancellation system for a road-tire interaction noise of the vehicle, and an active noise cancellation system for one or more active noises in the vehicle that hamper the voice activity therein. Each of the engine, road, and active noise cancellation systems is controlled based on the second acoustic state.

In some embodiments, when the second acoustic state corresponds to the vehicle moving at the reference speed with the plurality of windows closed and the presence of the voice activity therein, the engine noise cancellation system is deactivated and the road and active noise cancellation systems are activated. When the second acoustic state corresponds to the vehicle moving at the reference speed with the plurality of windows closed and the absence of the voice activity therein, the engine and active noise cancellation systems are deactivated and the road noise cancellation system is activated. When the second acoustic state corresponds to the vehicle moving at the reference speed with the one or more windows open and the presence of the voice activity therein, the engine and active noise cancellation systems are deactivated and the road noise cancellation system is one of a group consisting of activated and deactivated. When the second acoustic state corresponds to the vehicle moving at the reference speed with the one or more windows open and the absence of the voice activity therein, the engine and active noise cancellation systems are deactivated and the road noise cancellation system is one of a group consisting of activated and deactivated.

Overview

Conventionally, to reduce noises inside a cabin of a vehicle, various noise cancellation systems are utilized. Examples of the noise cancellation systems may include an engine noise cancellation system for an engine noise, a road noise cancellation system for a road-tire interaction noise, and an active noise cancellation system for various active noises that hamper a voice activity in the vehicle. Such noise cancellation systems improve the experience of the driver and passengers of the vehicle by detecting the associated noise and generating an anti-noise that dampens the effect of the detected noise. However, the operations performed by each noise cancellation system are resource-intensive tasks and require significant computational power. Typically, each noise cancellation system is activated and deactivated in an independent manner. Consequently, there may be situations where all the noise cancellation systems in the vehicle are activated, thereby leading to consumption of significant power and resources (e.g., signal processors, math accelerators, or the like).

Various embodiments of the present disclosure disclose a circuit that includes an adaptive noise classifier and a controller for controlling various noise cancellation systems of a vehicle. The noise cancellation systems may include an engine noise cancellation system for an engine noise of the vehicle, a road noise cancellation system for a road-tire interaction noise of the vehicle, and an active noise cancellation system for active noises in the vehicle that hamper a voice activity therein. The adaptive noise classifier may receive audio signals from various audio-capturing devices of the vehicle and determine a first acoustic state of the vehicle based on the received audio signals. Further, the controller may determine a second acoustic state of the vehicle based on the first acoustic state and one or more functional attributes of the vehicle. The second acoustic state is an updated version of the first acoustic state. Each acoustic state may be indicative of a noise profile in the vehicle. For example, the first acoustic state may indicate that the vehicle is moving with windows closed or with windows open, whereas the second acoustic state may indicate that the vehicle is moving at a reference speed with windows closed or open and presence or absence of the voice activity therein. Based on the second acoustic state, the controller may control an operational state of each noise cancellation system of the vehicle.

In the vehicle, the engine noise is less than a reduced road-tire interaction noise (e.g., after the reduction implemented by the road noise cancellation system). Similarly, the wind noise is greater than the reduced road-tire interaction noise and a reduced active noise (e.g., after the reduction implemented by the active noise cancellation system). The controller may utilize the second acoustic state to efficiently control the noise cancellation systems. For example, when the second acoustic state indicates that the vehicle is moving with windows closed and the presence/absence of the voice activity therein, the effect of the engine noise cancellation system may be negated (e.g., may not be experienced in the cabin of the vehicle) as the reduced road-tire interaction noise may be greater. Hence, the controller may deactivate the engine noise cancellation system. Similarly, when the second acoustic state indicates that the vehicle is moving at the reference speed with windows open and the presence of the voice activity therein, the wind noise may negate the effect of all three noise cancellation systems. In such cases, the controller may deactivate all three noise cancellation systems.

Thus, in some embodiments of the present disclosure, the efficient control of the noise cancellation systems results in a significantly reduced utilization of vehicular resources as compared to some conventional techniques where noise cancellation systems are controlled in an independent manner. Additionally, the power consumption is significantly less in some embodiments of the present disclosure as compared to some conventional techniques.

FIG. 1 illustrates a schematic block diagram of components of a vehicle 100 in accordance with an embodiment of the present disclosure. Various noises may be present in a cabin (shown later in FIG. 3) of the vehicle 100. Examples of such noises may include an engine noise, a road-tire interaction noise, one or more active noises that hamper a voice activity in the vehicle 100, or the like. Such noises cause discomfort to a driver (not shown) and passengers (not shown) of the vehicle 100. To reduce such noises, the vehicle 100 may include a plurality of noise cancellation systems 102.

The plurality of noise cancellation systems 102 may include an engine noise cancellation system 102*a* for the engine noise, a road noise cancellation system 102*b* for the road-tire interaction noise, and an active noise cancellation system 102*c* for the one or more active noises. In other words, the engine noise cancellation system 102*a* may reduce the engine noise of the vehicle 100, whereas, the road noise cancellation system 102*b* may reduce the road-tire interaction noise of the vehicle 100. Further, the active noise cancellation system 102*c* may reduce the one or more active noises in the vehicle 100 that hamper the voice activity therein. The engine noise and the road-tire interaction noise may also be classified as active noises in the vehicle 100, however, the active noises that hamper the voice activity are different from the engine noise and the road-tire interaction noise.

Each noise cancellation system of the plurality of noise cancellation systems 102 may be configured to execute various operations to reduce the effect of an associated noise. For example, the engine noise cancellation system 102*a* may be configured to detect the engine noise and generate an engine anti-noise based on the detected engine noise. The engine anti-noise may be complementary to the detected engine noise. For example, the engine anti-noise is a phase-reversed version of the detected engine noise. The engine noise cancellation system 102*a* may be further configured to drive a speaker (shown later in FIG. 3) of the vehicle 100 to play the engine anti-noise to cancel the detected engine noise. The road noise cancellation system 102*b* and the active noise cancellation system 102*c* may operate in a similar manner as described above. For example, each of the road and active noise cancellation systems 102*b* and 102*c* may be configured to generate an associated anti-noise and drive the speaker to play the generated anti-noise. In an embodiment, each noise cancellation system of the plurality of noise cancellation systems 102 is implemented as a processor core executing code. However, a noise cancellation system may be implemented in different ways including with different types of circuitry in other embodiments.

Although it is described that the anti-noise generated by each noise cancellation system is played on the same speaker, the scope of the present disclosure is not limited to it. In other embodiments, different speakers (not shown) of the vehicle 100 may be utilized for playing one or more anti-noises.

The operations performed by each noise cancellation system are resource-intensive tasks and require significant computational power. If each of the plurality of noise cancellation systems 102 are simultaneously activated, the strain on vehicular resources (e.g., signal processors, math accelerators, or the like) may be significant and the overall power consumption may shoot up. Hence, efficient management of the plurality of noise cancellation systems 102 is paramount. The vehicle 100 may thus include a management system 104 to efficiently manage the plurality of noise cancellation systems 102.

The management system 104 may be coupled to the plurality of noise cancellation systems 102. The management system 104 may be configured to determine a noise profile of the vehicle 100 based on various audios present in the vehicle 100 and one or more functional attributes of the vehicle 100. The one or more functional attributes of the vehicle 100 may include a speed of the vehicle 100, a position of a plurality of windows of the vehicle 100, a status of a voice detector of the vehicle 100, a tire pressure of a plurality of tires of the vehicle 100, a revolution count of an engine of the vehicle 100, a status of a heating, ventilation, and air conditioning (HVAC) system of the vehicle 100, or a combination thereof. The aforementioned functional attributes are exemplary and may be different in other embodiments. Various components (e.g., the plurality of windows, the voice detector, the plurality of tires, the engine, and the HVAC system) of the vehicle 100 and the associated positioning are shown later in FIGS. 2 and 3. Further, based on the determined noise profile, the management system 104 may be configured to control an operational state of each of the plurality of noise cancellation systems 102. The management system 104 may be implemented as an integrated circuit (IC) in the vehicle 100. The management system 104 may include an adaptive noise classifier 106 and a controller 108 that may be coupled to the adaptive noise classifier 106.

The adaptive noise classifier 106 may include suitable circuitry that may be configured to perform one or more operations. For example, the adaptive noise classifier 106 may be configured to determine a first acoustic state of the vehicle 100. The first acoustic state may be indicative of a dominant noise associated with the vehicle 100. The dominant noise may correspond to a noise of the engine (e.g., the engine noise) of the vehicle 100, a noise associated with an interaction of the plurality of tires of the vehicle 100 with a road (shown later in FIG. 2) on which the vehicle 100 is being driven (e.g., the road-tire interaction noise), or a wind noise in the vehicle 100. The adaptive noise classifier 106 may correspond to adaptive circuitry that may have a training phase and a deployment phase associated therewith. In an embodiment, the adaptive noise classifier 106 is implemented as a processor core executing code. However, the adaptive noise classifier 106 may be implemented in different ways including with different types of circuitry in other embodiments. During the training phase, the adaptive noise classifier 106 may be further configured to generate a plurality of model parameters (not shown) based on a plurality of training signals (not shown), and during the deployment phase, the adaptive noise classifier 106 may determine the first acoustic state based on the plurality of model parameters and various audios present in the vehicle 100.

Training Phase:

The training of the adaptive noise classifier 106 may be implemented in an offline environment (e.g., not when the management system 104 is in-field for its designated application). During the training phase, the adaptive noise classifier 106 may be configured to receive the plurality of training signals from a training circuit (not shown). The plurality of training signals correspond to an offline dataset that resembles real-world (e.g., in-field) use cases utilized to train the adaptive noise classifier 106. Thus, each training signal may be indicative of an audio associated with the vehicle 100.

The adaptive noise classifier 106 may be further configured to extract a first plurality of features from each training signal. The first plurality of features may include a time period, a measure of periodicity, a spectral envelope, one or more cepstral attributes, and one or more spectral band energy levels associated with the corresponding training signal. The aforementioned features are exemplary and may be different in other embodiments. Each feature may correspond to a numerical, logical, or Boolean representation of information extracted from the training signal. Additionally, each feature may be a scalar quantity or a vector quantity. For example, the time period and the measure of periodicity may be scalar quantities, whereas, the spectral envelope, the one or more cepstral attributes, and the one or more spectral band energy levels may be vector quantities. Further, in an embodiment, one set of features may be extracted based on the analysis of a predefined portion of each training signal and may be arranged in the form of a feature vector. Thus, the first plurality of features extracted for each training signal may include multiple feature vectors. The adaptive noise classifier 106 may be further configured to process the first plurality of features of each training signal to generate the plurality of model parameters. In other words, the first plurality of features extracted from each training signal are modeled (e.g., are generalized for inference).

During the training phase, the adaptive noise classifier 106 may be further configured to update the plurality of model parameters in an iterative manner. In some embodiments of the present disclosure, the plurality of model parameters are updated by way of supervised learning. For example, initially, the adaptive noise classifier 106 may be configured to initialize the plurality of model parameters to a plurality of predefined values. Further, for each iteration, the adaptive noise classifier 106 may be configured to generate output data (not shown) based on the plurality of model parameters and the first plurality of features of each training signal. The adaptive noise classifier 106 may be further configured to compare the output data with target data (not shown) to determine an error associated with the adaptive noise classifier 106 (e.g., the plurality of model parameters). The target data may correspond to a desired output of supervised learning. The plurality of model parameters for each iteration are updated based on the corresponding determined error (e.g., the determined error at the end of the corresponding iteration). In an embodiment, the adaptive noise classifier 106 may be further configured to determine a cost function from the determined error, and the plurality of model parameters may be updated based on the determined cost function. The cost function may correspond to a squared error, a squared error averaged over a predefined number of frames, or the like. The update of the plurality of model parameters may be executed iteratively until the error is below a tolerance limit. The training phase of the adaptive noise classifier 106 is thus completed when the determined error is below the tolerance limit.

Deployment Phase:

The trained adaptive noise classifier 106 may be utilized in-field to determine the noise profile of the vehicle 100. The adaptive noise classifier 106 may be configured to receive various audio signals (e.g., first through sixth audio signals AS1-AS6) indicative of various audios (e.g., noises) associated with the vehicle 100. The vehicle 100 may further include first through sixth audio-capturing devices 110*a*-110*f* that may be configured to generate the first through sixth audio signals AS1-AS6, respectively. The adaptive noise classifier 106 may thus be coupled to the first through sixth audio-capturing devices 110*a*-110*f*, and receive the first through sixth audio signals AS1-AS6 from the first through sixth audio-capturing devices 110*a*-110*f*, respectively. In an embodiment, each of the first through sixth audio-capturing devices 110*a*-110*f* corresponds to a microphone. The first through sixth audio signals AS1-AS6 may be collectively referred to as a "plurality of audio signals AS1-AS6", and the first through sixth audio-capturing devices 110*a*-110*f* may be collectively referred to as a "plurality of audio-capturing devices 110". The plurality of audio-capturing devices 110 may be located at different parts of the vehicle 100. For example, the first through fourth audio-capturing devices 110*a*-110*d* may be located near the plurality of tires of the vehicle 100, the fifth audio-capturing device 110*e* may be located near the engine of the vehicle 100, and the sixth audio-capturing device 110*f* may be located in the cabin of the vehicle 100.

Six audio-capturing devices are illustrated in FIG. 1 to make the illustration concise and clear and should not be considered a limitation of the present disclosure. In various other embodiments, the vehicle 100 may include more than or less than six audio-capturing devices, without deviating from the scope of the present disclosure.

The adaptive noise classifier 106 may be further configured to filter the plurality of audio signals AS1-AS6 and extract a second plurality of features from each audio signal of the plurality of audio signals AS1-AS6. The second plurality of features may be similar to the first plurality of features. For example, the second plurality of features may include a time period, a measure of periodicity, a spectral envelope, one or more cepstral attributes, and one or more spectral band energy levels associated with the corresponding audio signal. The first acoustic state of the vehicle 100 is determined based on the second plurality of features of each audio signal of the plurality of audio signals AS1-AS6 and the plurality of model parameters.

The adaptive noise classifier 106 may be further configured to generate classification data CLF indicative of the first acoustic state and provide the classification data CLF to the controller 108. The first acoustic state is indicative of a partial noise profile of the vehicle 100. The one or more functional attributes of the vehicle 100 may be utilized by the controller 108 to validate the first acoustic state as well as determine a refined (e.g., a complete) noise profile of the vehicle 100.

The controller 108 may include suitable circuitry that may be configured to perform one or more operations. For example, the controller 108 may be configured to receive the classification data CLF from the adaptive noise classifier 106. Further, the controller 108 may be configured to receive status data SD indicative of the one or more functional attributes of the vehicle 100. The vehicle 100 may further include a sensor circuit 112 that may be configured to generate the status data SD. The controller 108 may thus be coupled to the sensor circuit 112, and receive the status data SD from the sensor circuit 112.

The status data SD may include a first set of values indicative of the speed of the vehicle 100, a second set of values indicative of the position of the plurality of windows of the vehicle 100, and a third set of values indicative of the status of the voice detector of the vehicle 100. Additionally, the status data SD may include a fourth set of values indicative of the tire pressure of the plurality of tires of the vehicle 100, a fifth set of values indicative of the revolution count of the engine of the vehicle 100, and a sixth set of values indicative of the status of the HVAC system of the vehicle 100. Each of the first through sixth sets of values may be generated by a set of sensors (not shown) of the vehicle 100. For example, a set of speed sensors may generate the first set of values, a set of position sensors may generate the second set of values, a set of voice sensors may generate the third set of values, a set of pressure sensors may generate the fourth set of values, a set of revolution counters may generate the fifth set of values, and a set of HVAC sensors may generate the sixth set of values. The sensor circuit 112 may be configured to receive the output of each set of sensors, generate the status data SD, and provide the status data SD to the controller 108.

Based on the first acoustic state of the vehicle 100 and the status data SD, the controller 108 may be further configured to determine a second acoustic state of the vehicle 100. In other words, the controller 108 determines the second acoustic state based on the classification data CLF and the one or more functional attributes of the vehicle 100. The second acoustic state is an updated version of the first acoustic state.

The controller 108 may be further configured to validate the first acoustic state based on the status data SD. As the first acoustic state is indicative of the dominant noise in the vehicle 100, the controller 108 may utilize the one or more functional attributes of the vehicle 100 to validate the first acoustic state and determine the second acoustic state exclusively after successful validation of the first acoustic state. Thus, the controller 108 determines the second acoustic state further based on the validation of the first acoustic state. Although it is described that the first acoustic state is validated prior to the determination of the second acoustic state, the scope of the present disclosure is not limited to it. In other embodiments, the validation of the first acoustic state may not be performed.

The second acoustic state thus corresponds to the refined (e.g., the complete) noise profile of the vehicle 100. In one example, the first acoustic state corresponds to the vehicle 100 moving with the plurality of windows thereof closed or open. The vehicle 100 moving with the plurality of windows thereof open may indicate that the wind noise is the dominant noise in the vehicle 100. Similarly, the vehicle 100 moving with the plurality of windows thereof closed may indicate that the road-tire interaction noise is the dominant noise in the vehicle 100. In such a scenario, the controller 108 may validate and update the first acoustic state based on the status data SD. The second acoustic state may correspond to the vehicle 100 moving at a reference speed with the plurality of windows closed or open and presence or absence of the voice activity therein. The reference speed may correspond to a speed greater than 20 kilometers/hour. However, in other embodiments, the reference speed may have other values. The position of the plurality of windows and the speed of the vehicle 100 may be utilized to validate the first acoustic state. Further, the speed of the vehicle 100, the position of the plurality of windows, and the status of the voice detector may be utilized for determining the second acoustic state.

The scope of the present disclosure is not limited to the aforementioned exemplary acoustic states. In other embodiments, different acoustic states, indicative of the corresponding noise profiles, may be determined, without deviating from the scope of the present disclosure. In such cases, some other functional attributes of the vehicle 100 (such as the tire pressure of the plurality of tires, the revolution count of the engine, the status of the HVAC system, or the like) may be utilized to validate and update the first acoustic state.

The controller 108 may be further configured to control the operational state of each of the plurality of noise cancellation systems 102 based on the second acoustic state of the vehicle 100. To control the operational state of each of the plurality of noise cancellation systems 102, the controller 108 may be further configured to generate various control signals (e.g., first through third control signals CS1-CS3) and provide the first through third control signals CS1-CS3 to the engine, road, and active noise cancellation systems 102*a*, 102*b*, and 102*c*, respectively. The first through third control signals CS1-CS3 are collectively referred to as a "plurality of control signals CS1-CS3". Each control signal controls activation and deactivation of a corresponding noise cancellation system. In an embodiment, a logic low state of a control signal deactivates the corresponding noise cancellation system and a logic high state of the control signal activates the corresponding noise cancellation system. The control of the plurality of noise cancellation systems 102 based on the second acoustic state results in the efficient management of the plurality of noise cancellation systems 102. The control of the plurality of noise cancellation systems 102 is explained in detail in conjunction with FIG. 4.

The controller 108 may be further configured to generate, based on the first acoustic state and the one or more functional attributes of the vehicle 100, feedback data FB indicative of the update of the plurality of model parameters. The feedback data FB may include label information utilized for updating the plurality of model parameters. Further, the controller 108 may be configured to provide the feedback data FB to the adaptive noise classifier 106. The adaptive noise classifier 106 may be further configured to update the plurality of model parameters based on the feedback data FB (e.g., the one or more functional attributes of the vehicle 100). The plurality of model parameters are thus updated even during the deployment phase of the adaptive noise classifier 106. As a result, the number and variety of the plurality of training signals required for training the adaptive noise classifier 106 in the offline environment are reduced. In an embodiment, the controller 108 is implemented as a processor core executing code. However, the controller 108 may be implemented in different ways including with different types of circuitry in other embodiments.

The scope of the present disclosure is not limited to the controller 108 enabling the model parameter update. In other embodiments, any other circuitry of the vehicle 100 may be configured to generate the feedback data FB, without deviating from the scope of the present disclosure.

Figure 2:
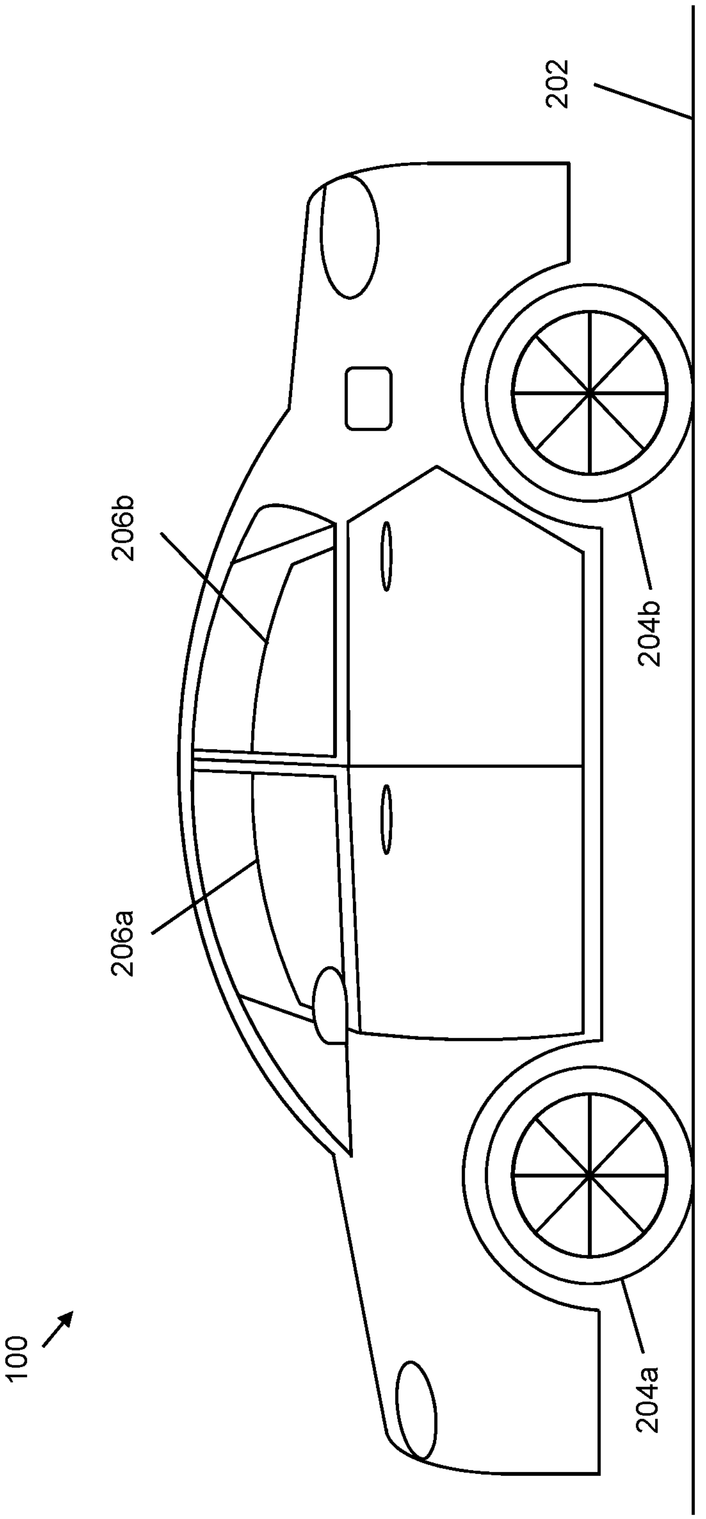
FIG. 2 illustrates a schematic diagram of a side view of the vehicle of FIG. 1 being driven on a road in accordance with an embodiment of the present disclosure.

FIG. 2 illustrates a schematic diagram of a side view of the vehicle 100 being driven on the road in accordance with an embodiment of the present disclosure. The road is hereinafter referred to and designated as the "road 202". The vehicle 100 may include the plurality of tires and the plurality of windows. The plurality of tires may include first and second tires 204*a* and 204*b* and third and fourth tires (shown later in FIG. 3). Similarly, the plurality of windows may include first and second windows 206*a* and 206*b* and third through fifth windows (not shown). The first and second windows 206*a* and 206*b* and the third and fourth windows may correspond to the side windows of the vehicle 100, whereas, the fifth window may correspond to the roof window (e.g., the sunroof) of the vehicle 100. As the vehicle 100 is being driven on the road 202, the plurality of tires interact with the road 202, thereby resulting in the road-tire interaction noise. Additionally, the plurality of windows contribute to the wind noise in the vehicle 100. For example, as illustrated in FIG. 2, the first and second windows 206*a* and 206*b* may be open, thereby resulting in the wind noise in the vehicle 100.

Figure 3:
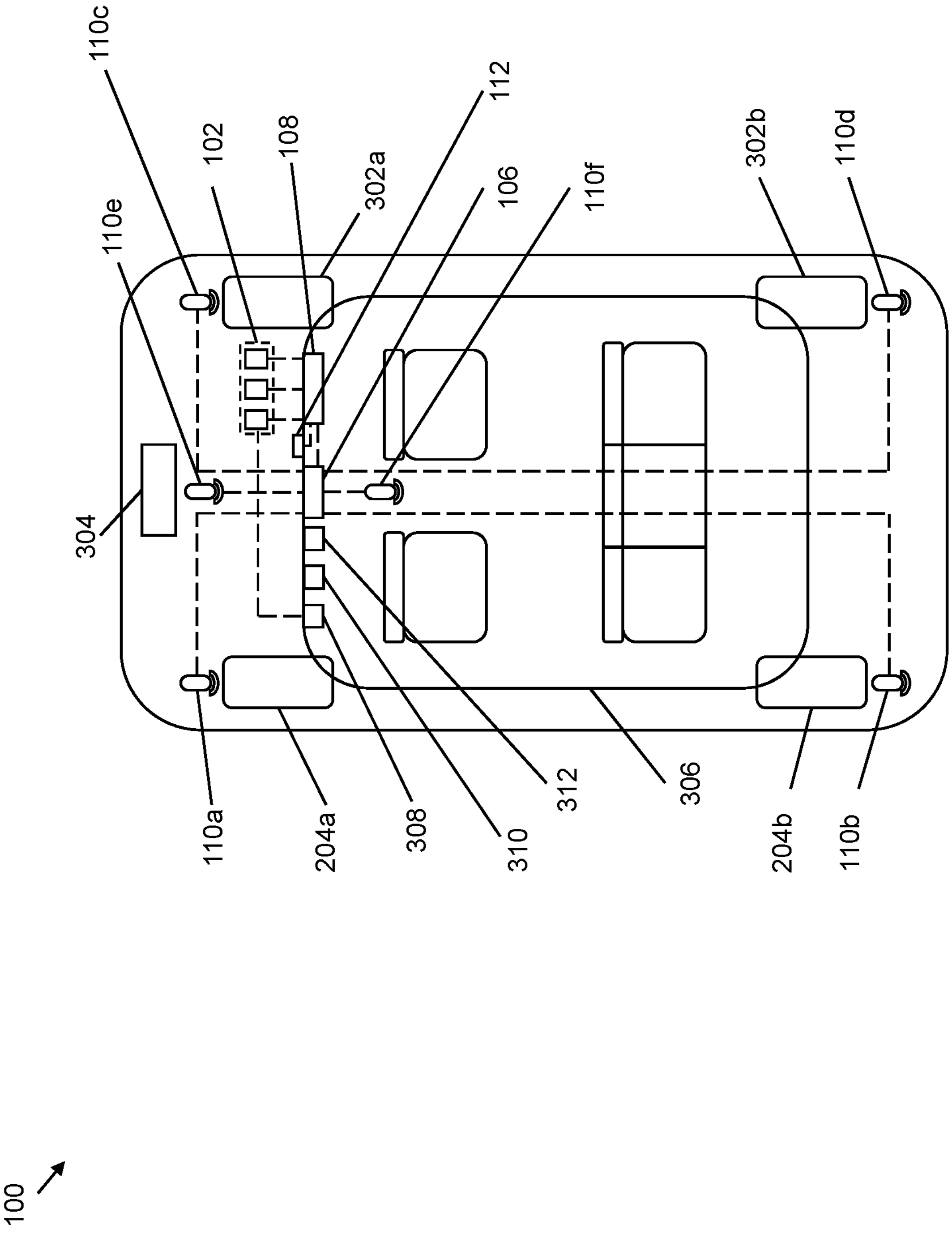
FIG. 3 illustrates a top sectional view of the vehicle of FIG. 1 in accordance with an embodiment of the present disclosure.

FIG. 3 illustrates a top sectional view of the vehicle 100, in accordance with an embodiment of the present disclosure. The vehicle 100 may include the first and second tires 204*a* and 204*b* and the third and fourth tires (hereinafter referred to and designated as the "third and fourth tires 302*a* and 302*b*"). The first and third tires 204*a* and 302*a* may correspond to the front tires of the vehicle 100 and the second and fourth tires 204*b* and 302*b* may correspond to the rear tires of the vehicle 100. The first through fourth audio-capturing devices 110*a*-110*d* may be located near the first through fourth tires 204*a*, 204*b*, 302*a*, and 302*b*, respectively, to capture the respective road-tire interaction noises. Further, the vehicle 100 may include the engine (hereinafter referred to and designated as the "engine 304"), and the fifth audio-capturing device 110*e* may be located near the engine 304 to capture the engine noise. Further, the sixth audio-capturing device 110*f* may be located in the cabin (hereinafter referred to and designated as the "cabin 306") of the vehicle 100 to capture the one or more active noises therein which may hamper the voice activity in the vehicle 100. The vehicle 100 may further include the speaker, the voice detector, the HVAC system, the adaptive noise classifier 106, the controller 108, the sensor circuit 112, and the plurality of noise cancellation systems 102 that may be placed in/on a dashboard (not shown) of the vehicle 100. The speaker, the voice detector, and the HVAC system may be hereinafter referred to and designated as the "speaker 308", the "voice detector 310", and the "HVAC system 312", respectively.

The positions of various components of the vehicle 100 illustrated in FIG. 3 are exemplary and may be different in other embodiments. Additionally, various other components of the vehicle 100 may be utilized for determining the one or more functional attributes of the vehicle 100.

FIG. 4 illustrates a table 400 that describes the control of the plurality of noise cancellation systems 102 in accordance with an embodiment of the present disclosure. The table 400 may include first through fourth columns 402*a*-402*d*. The first column 402*a* indicates various examples of the second acoustic state. Further, the second through fourth columns 402*b*-402*d* indicate the operational state of the engine, road, and active noise cancellation systems 102*a*, 102*b*, and 102*c*, respectively, for each example of the second acoustic state.

In a first example, the second acoustic state corresponds to the vehicle 100 moving at the reference speed with the plurality of windows closed and the presence of the voice activity therein. The movement of the vehicle 100 at the reference speed indicates the presence of the engine noise and the road-tire interaction noise. Further, as the voice activity is present in the vehicle 100, reduction of various active noises is necessitated to enhance the voice activity. In some conventional techniques, each of the engine, road, and active noise cancellation systems 102*a*, 102*b*, and 102*c* is controlled independently, and hence, the above-mentioned example of the second acoustic state may result in the activation of all three noise cancellation systems.

In the present disclosure, however, the noise profile of the vehicle 100 is utilized to control the engine, road, and active noise cancellation systems 102*a*, 102*b*, and 102*c* in an efficient manner. For example, the road-tire interaction noise is greater than the engine noise by 20-30 decibels (dB), and the road noise cancellation system 102*b* may achieve a reduction of 3-5 dB. Thus, the engine noise is still less than the reduced road-tire interaction noise. In such cases, the effect of the engine noise cancellation system 102*a* may be negated (e.g., not be experienced in the cabin 306 of the vehicle 100) by the reduced road-tire interaction noise. Hence, in the present disclosure, when the second acoustic state corresponds to the vehicle 100 moving at the reference speed with the plurality of windows closed and the presence of the voice activity therein, the engine noise cancellation system 102*a* is deactivated and exclusively the road and active noise cancellation systems 102*b* and 102*c* are activated. In other words, the first control signal CS1 is at a logic low state and the second and third control signals CS2 and CS3 are at a logic high state. If it is assumed that the computational power required by each of the engine, road, and active noise cancellation systems 102*a*, 102*b*, and 102*c* is 'X' units, the computational power consumption in the present disclosure is '2X' units, whereas, that in some conventional techniques is '3X' units. The efficient control of the plurality of noise cancellation systems 102 thus achieves a power reduction of 'X' units (e.g., 33.3%).

In a second example, the second acoustic state corresponds to the vehicle 100 moving at the reference speed with the plurality of windows closed and the absence of the voice activity therein. In some conventional techniques, the engine and road noise cancellation systems 102*a* and 102*b* may be activated and the active noise cancellation system 102*c* may be deactivated. In the present disclosure, however, the engine and active noise cancellation systems 102*a* and 102*c* are deactivated, and exclusively the road noise cancellation system 102*b* is activated for the same reason as described above in the first example. Thus, the computational power consumption in the present disclosure is 'X' units, whereas, that in some conventional techniques is '2X' units. The efficient control of the plurality of noise cancellation systems 102 thus achieves a power reduction of 'X' units (e.g., 50%).

In a third example, the second acoustic state corresponds to the vehicle 100 moving at the reference speed with the one or more windows open and the presence of the voice activity therein. The movement of the vehicle 100 at the reference speed with the one or more windows open indicates the presence of the engine noise, the road-tire interaction noise, and the wind noise. In some conventional techniques, each of the engine, road, and active noise cancellation systems 102*a*, 102*b*, and 102*c* may be activated. In the present disclosure, however, the noise profile of the vehicle 100 is utilized to control the engine, road, and active noise cancellation systems 102*a*, 102*b*, and 102*c* in an efficient manner. For example, the wind noise is greater than the road-tire interaction noise, the one or more active noises, and the engine noise by 5-6 dB, 10-15 dB, and 10-12 dB, respectively, and each noise cancellation system may achieve a reduction of 3-5 dB. Thus, the effect of each of the engine, road, and active noise cancellation systems 102*a*, 102*b*, and 102*c* may be negated by the wind noise.

Hence, in the present disclosure, when the second acoustic state corresponds to the vehicle 100 moving at the reference speed with the one or more windows open and the presence of the voice activity therein, the engine, road, and active noise cancellation systems 102*a*, 102*b*, and 102*c* are deactivated. Thus, the computational power consumption in the present disclosure is null, whereas, that in some conventional techniques is '3X' units. The efficient control of the plurality of noise cancellation systems 102 thus achieves a power reduction of '3X' units (e.g., 100%).

In a fourth example, the second acoustic state corresponds to the vehicle 100 moving at the reference speed with the one or more windows open and the absence of the voice activity therein. In some conventional techniques, the engine and road noise cancellation systems 102*a* and 102*b* may be activated and the active noise cancellation system 102*c* may be deactivated. In the present disclosure, however, each of the engine, road, and active noise cancellation systems 102*a*, 102*b*, and 102*c* is deactivated for the same reason as described in the third example. Thus, the computational power consumption in the present disclosure is null, whereas, that in some conventional techniques is '2X' units. The efficient management of the plurality of noise cancellation systems 102 thus achieves a power reduction of '2X' units (e.g., 100%).

Although for the third and fourth examples it is described that the road noise cancellation system 102*b* is deactivated, the scope of the present disclosure is not limited to it. In other embodiments, the road noise cancellation system 102*b* may be activated for the third and fourth examples. In an exemplary embodiment, whether to activate or deactivate the road noise cancellation system 102*b* for the third and fourth examples may be determined based on the value of the reference speed. For example, if the reference speed corresponds to speeds of 50-60 kilometers/hour, the wind noise may be significant, and hence, the road noise cancellation system 102*b* may be deactivated. Conversely, if the reference speed corresponds to speeds of 20-25 kilometers/hour, the difference between the wind noise and the road-tire interaction noise may not be significant, and hence, the road noise cancellation system 102*b* may be activated to reduce the effect of the road-tire interaction noise.

In each of the above-mentioned examples, in addition to the reduced computational power consumption, the utilization of vehicular resources as well as the power required to drive the speaker 308 are also significantly reduced as compared to some conventional techniques. The available vehicular resources may be utilized for executing various other critical operations associated with the vehicle 100.

The scope of the present disclosure is not limited to examples of the second acoustic state described in FIG. 4. In various other embodiments, the noise profile of the vehicle 100 may be different. In one example, the second acoustic state may indicate that the vehicle 100 is idling with the plurality of windows closed and the presence of the voice activity therein. In such a scenario, the engine noise may be the dominant noise as determined by the adaptive noise classifier 106. Hence, the engine noise cancellation system 102*a* may be activated and the road noise cancellation system 102*b* may be deactivated. Further, as the plurality of windows are closed and the vehicle 100 is idling, the active noises may be at a level that does not hamper the voice activity in the vehicle 100. As a result, the active noise cancellation system 102*c* may be deactivated. Similarly, in another example, the second acoustic state may indicate that the vehicle 100 is idling with the one or more windows open and the presence of the voice activity therein. In such a scenario, the engine and active noise cancellation systems 102*a* and 102*c* may be activated and the road noise cancellation system 102*b* may be deactivated.

Thus, the overall noise profile of the vehicle 100 is utilized to control the plurality of noise cancellation systems 102 in a co-dependent manner. The control technique implemented in the present disclosure is thus more efficient than some conventional techniques that control the noise cancellation systems in an independent manner.

Figure 5:
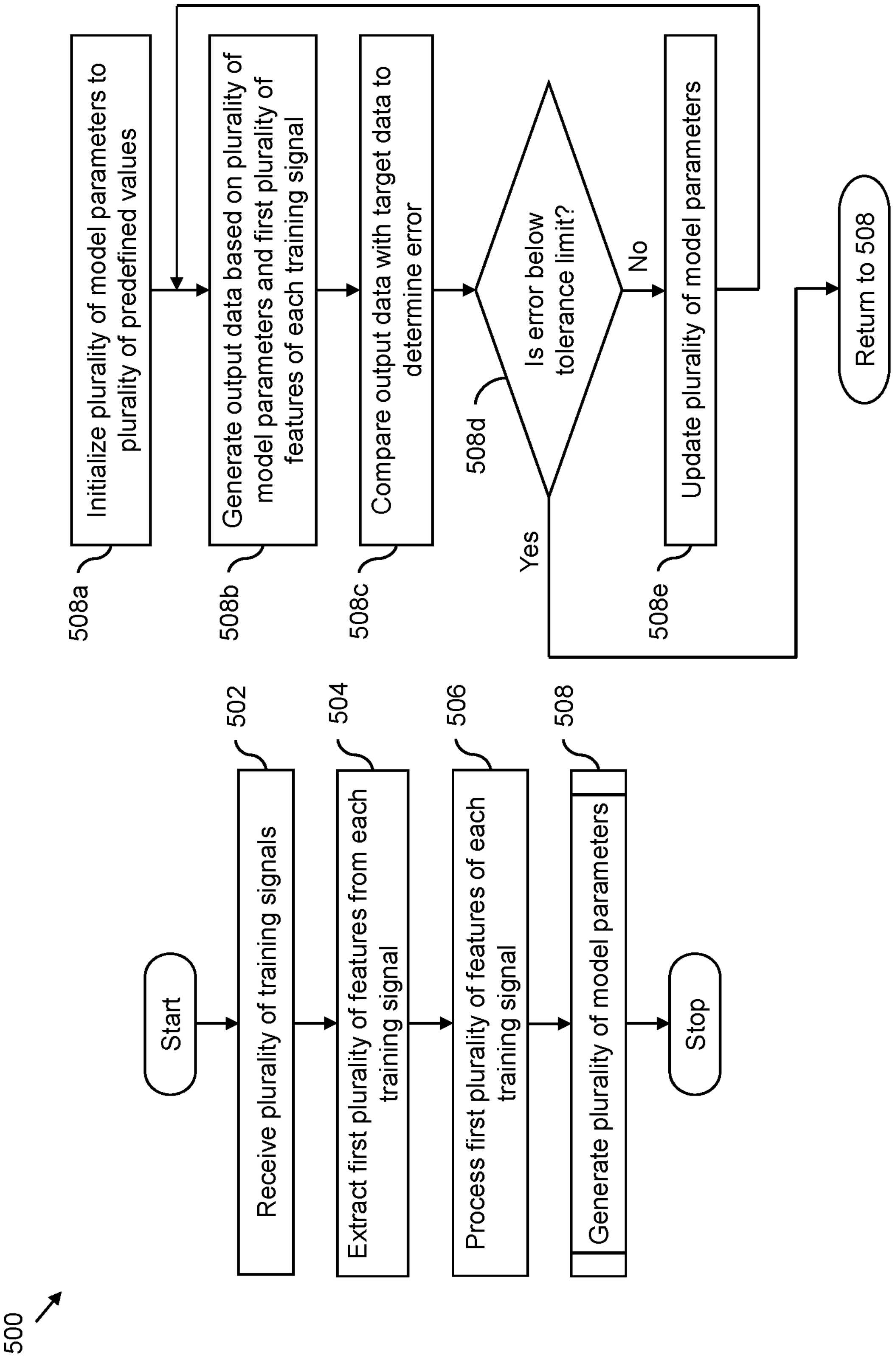
FIG. 5 represents a first flowchart that illustrates a method for training an adaptive noise classifier of the vehicle of FIG. 1 in accordance with an embodiment of the present disclosure.

FIG. 5 represents a first flowchart 500 that illustrates a method for training the adaptive noise classifier 106 in accordance with an embodiment of the present disclosure. The adaptive noise classifier 106 may be trained in an offline environment.

At step 502, the adaptive noise classifier 106 may receive the plurality of training signals. At step 504, the adaptive noise classifier 106 may extract the first plurality of features from each training signal. At step 506, the adaptive noise classifier 106 may process the first plurality of features of each training signal. At step 508, the adaptive noise classifier 106 may generate the plurality of model parameters. The plurality of model parameters may be generated based on the processing of the first plurality of features of each training signal.

The generation of the plurality of model parameters is described by way of steps 508*a*-508*c*. At step 508*a*, the adaptive noise classifier 106 may initialize the plurality of model parameters to the plurality of predefined values. At step 508*b*, the adaptive noise classifier 106 may generate the output data based on the plurality of model parameters and the first plurality of features of each training signal. At step 508*c*, the adaptive noise classifier 106 may compare the output data with the target data to determine the error associated with the plurality of model parameters. At step 508*d*, the adaptive noise classifier 106 may determine whether the error is below the tolerance limit. If at step 508*d*, it is determined that the error is above the tolerance limit, step 508*e* is performed. At step 508*e*, the adaptive noise classifier 106 may update the plurality of model parameters based on the determined error. Step 508*b* may be performed after step 508*e*. If at step 508*d*, it is determined that the error is below the tolerance limit, the training of the adaptive noise classifier 106 is completed. The plurality of model parameters of the last iteration are utilized in the deployment phase for generating the first acoustic state.

Although it is described that the adaptive noise classifier 106 is trained in the offline environment, the scope of the present disclosure is not limited to it. In other embodiments, the adaptive noise classifier 106 may be trained in-field, without deviating from the scope of the present disclosure.

Figure 6A:
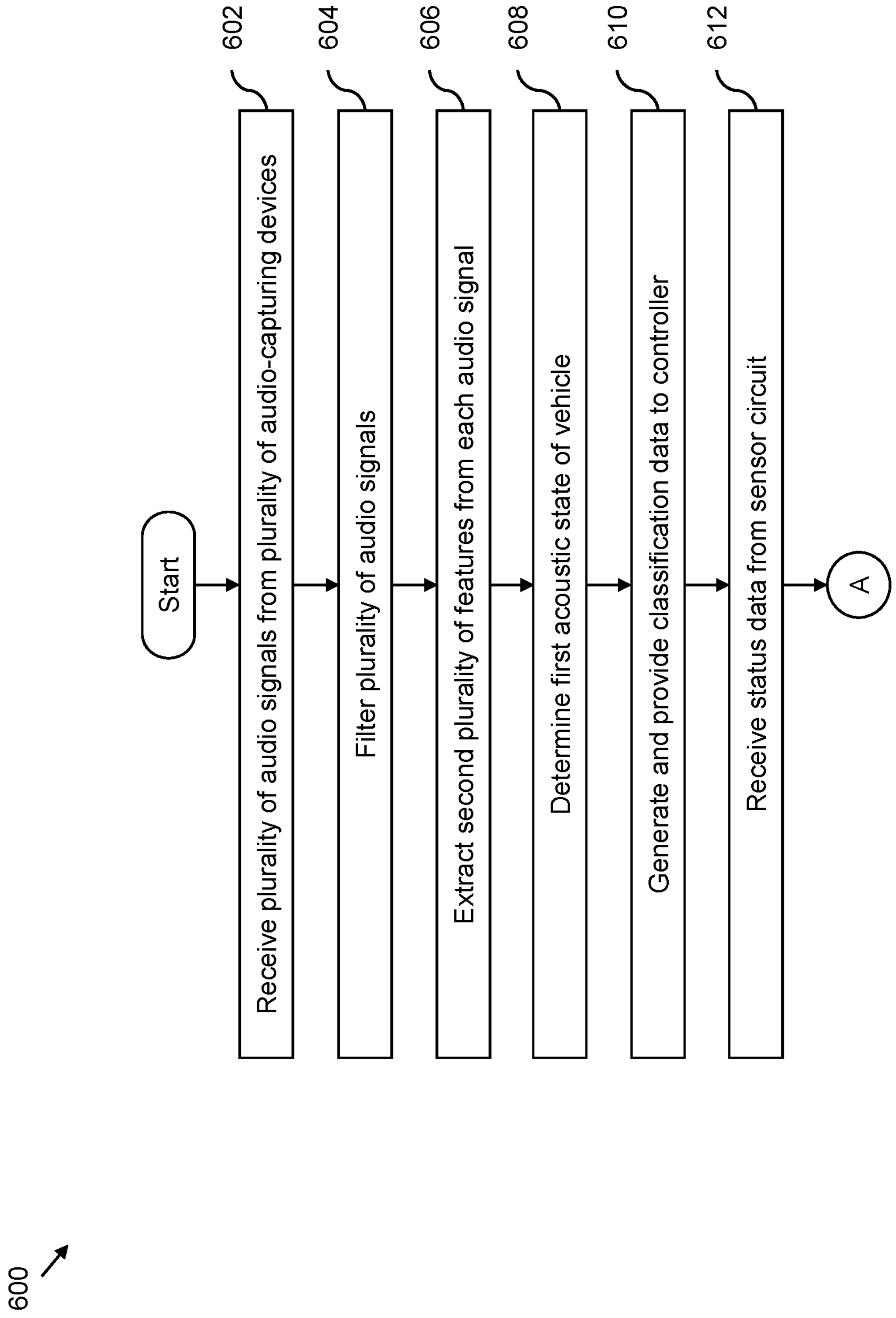
FIGS. 6A and 6B, collectively, represent a second flowchart that illustrates a method for controlling the plurality of noise cancellation systems of the vehicle of FIG. 1 in accordance with an embodiment of the present disclosure.
Figure 6B:
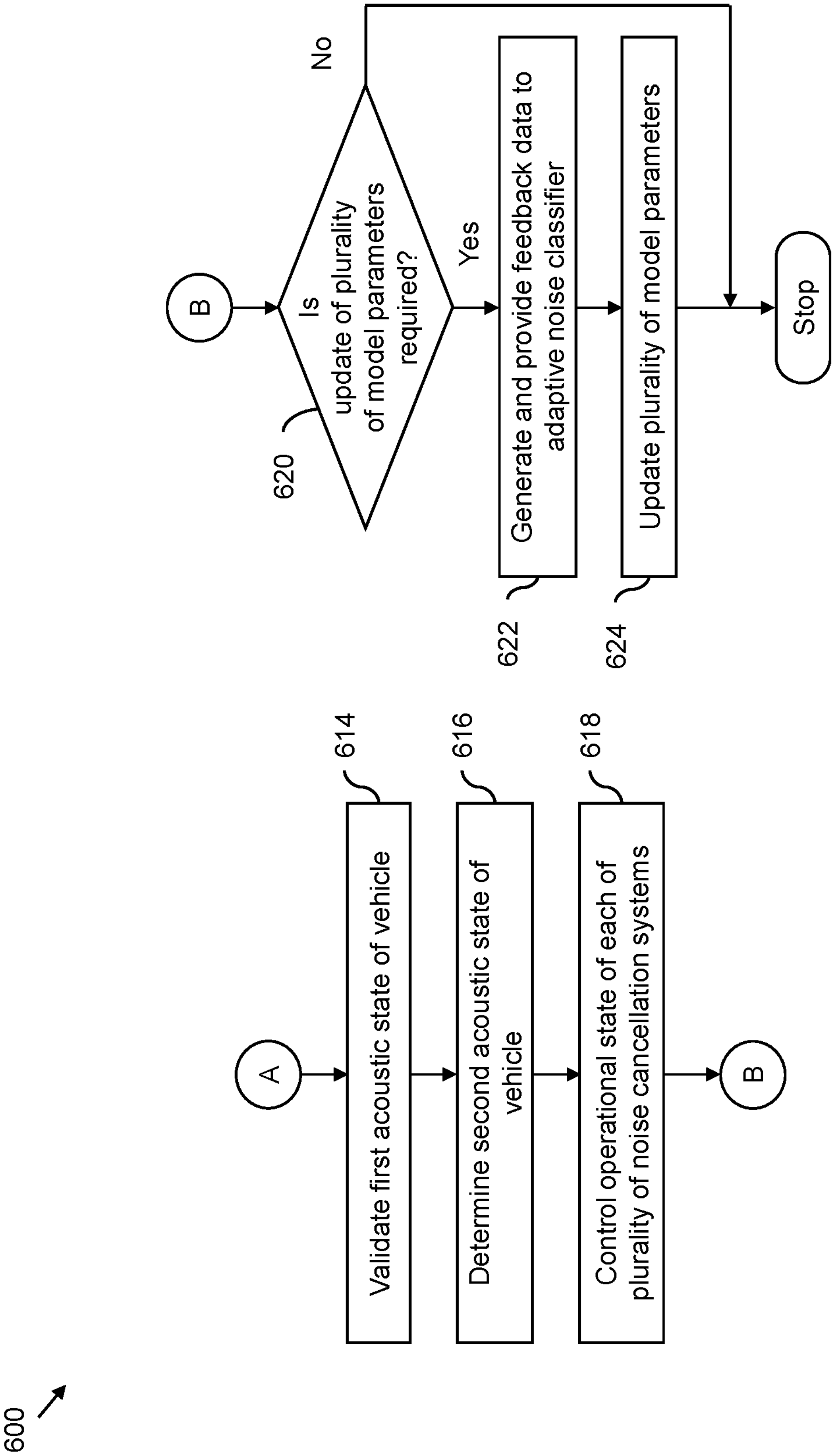

FIGS. 6A and 6B, collectively, represent a second flowchart 600 that illustrates a method for controlling the plurality of noise cancellation systems 102 in accordance with an embodiment of the present disclosure. The vehicle control method for controlling the plurality of noise cancellation systems 102 may be implemented by the adaptive noise classifier 106 and the controller 108.

Referring to FIG. 6A, at step 602, the adaptive noise classifier 106 may receive the plurality of audio signals AS1-AS6 from the plurality of audio-capturing devices 110. At step 604, the adaptive noise classifier 106 may filter the plurality of audio signals AS1-AS6. At step 606, the adaptive noise classifier 106 may extract the second plurality of features from each audio signal. At step 608, the adaptive noise classifier 106 may determine the first acoustic state of the vehicle 100. The first acoustic state may be determined based on the second plurality of features extracted from each audio signal and the plurality of model parameters. At step 610, the adaptive noise classifier 106 may generate and provide the classification data CLF to the controller 108. The classification data CLF may be indicative of the first acoustic state. At step 612, the controller 108 may receive the status data SD from the sensor circuit 112.

Referring to FIG. 6B, at step 614, the controller 108 may validate the first acoustic state. The first acoustic state may be validated based on the status data SD. At step 616, the controller 108 may determine the second acoustic state of the vehicle 100. The second acoustic state may be determined based on the status data SD and the validated first acoustic state. At step 618, the controller 108 may control the operational state of each of the plurality of noise cancellation systems 102 of the vehicle 100 based on the second acoustic state. At step 620, the controller 108 may determine whether the update of the plurality of model parameters is required. The controller 108 may determine that the update of the plurality of model parameters is required based on various factors such as a lapse of a periodic interval, an error associated with the first acoustic state, or the like. If at step 620, it is determined that the update of the plurality of model parameters is required, step 622 is performed. At step 622, the controller 108 may generate and provide the feedback data FB to the adaptive noise classifier 106. The feedback data FB may be indicative of the update of the plurality of model parameters. At step 624, the adaptive noise classifier 106 may update the plurality of model parameters based on the feedback data FB.

Thus, in some embodiments of the present disclosure, the efficient control of the plurality of noise cancellation systems 102 results in a significantly reduced utilization of the vehicular resources as compared to some conventional techniques where noise cancellation systems are controlled in an independent manner. The available vehicular resources may be utilized for executing various other critical operations associated with the vehicle 100. Additionally, the power consumption is significantly less in some embodiments of the present disclosure as compared to some conventional techniques.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims. Further, unless stated otherwise, terms such as "first" and "second" are used to arbitrarily distinguish between the elements such terms describe. Thus, these terms are not necessarily intended to indicate temporal or other prioritization of such elements.

We claim:

1. A circuit, comprising:

an adaptive noise classifier configured to receive a plurality of audio signals from a plurality of audio-capturing devices of a vehicle and determine a first acoustic state of the vehicle based on the plurality of audio signals; and a controller that is coupled to the adaptive noise classifier, wherein the controller is configured to:

receive status data indicative of one or more functional attributes of the vehicle;

determine, based on the first acoustic state of the vehicle and the status data, a second acoustic state of the vehicle, wherein the second acoustic state is an updated version of the first acoustic state; and control an operational state of each of a plurality of noise cancellation systems of the vehicle based on the second acoustic state of the vehicle;

wherein the controller is further configured to validate the first acoustic state based on the status data, and wherein the second acoustic state is further determined based on the validation of the first acoustic state.

2. The circuit of claim 1, wherein the one or more functional attributes of the vehicle comprise at least one of a group consisting of (i) a speed of the vehicle, (ii) a position of a plurality of windows of the vehicle, (iii) a status of a voice detector of the vehicle, (iv) a tire pressure of a plurality of tires of the vehicle, (v) a revolution count of an engine of the vehicle, and (vi) a status of a heating, ventilation, and air conditioning (HVAC) system of the vehicle.

3. The circuit of claim 1, wherein the first acoustic state of the vehicle is indicative of a dominant noise associated with the vehicle, and wherein the dominant noise corresponds to one of a group consisting of (i) an engine noise of the vehicle, (ii) a road-tire interaction noise of the vehicle, and (iii) a wind noise in the vehicle.

4. The circuit of claim 1, wherein the adaptive noise classifier is further configured to generate classification data that is indicative of the first acoustic state of the vehicle and provide the classification data to the controller, and wherein the controller determines the second acoustic state based on the classification data and the one or more functional attributes of the vehicle.

5. The circuit of claim 1, wherein to control the operational state of each of the plurality of noise cancellation systems, the controller is further configured to generate a plurality of control signals and provide the plurality of control signals to the plurality of noise cancellation systems, and wherein each control signal controls activation and deactivation of a corresponding noise cancellation system.

6. The circuit of claim 1, wherein the adaptive noise classifier has a training phase and a deployment phase associated therewith, wherein during the training phase, the adaptive noise classifier is further configured to generate a plurality of model parameters based on a plurality of training signals, and wherein during the deployment phase, the adaptive noise classifier determines the first acoustic state of the vehicle based on the plurality of model parameters and the plurality of audio signals.

7. The circuit of claim 1, wherein the first acoustic state corresponds to one of a group consisting of (i) the vehicle moving with a plurality of windows thereof closed and (ii) the vehicle moving with one or more windows, of the plurality of windows, open, and wherein the second acoustic state corresponds to one of a group consisting of (i) the vehicle moving at a reference speed with the plurality of windows closed and presence of a voice activity therein, (ii) the vehicle moving at the reference speed with the plurality of windows closed and absence of the voice activity therein, (iii) the vehicle moving at the reference speed with the one or more windows open and the presence of the voice activity therein, and (iv) the vehicle moving at the reference speed with the one or more windows open and the absence of the voice activity therein.

8. The circuit of claim 1, wherein the plurality of noise cancellation systems comprise an engine noise cancellation system for an engine noise of the vehicle, a road noise cancellation system for a road-tire interaction noise of the vehicle, and an active noise cancellation system for one or more active noises in the vehicle that hamper the voice activity therein, and wherein each of the engine noise cancellation system, the road noise cancellation system, and the active noise cancellation system is controlled based on the second acoustic state.

9. A circuit, comprising:

an adaptive noise classifier configured to receive a plurality of audio signals from a plurality of audio-capturing devices of a vehicle and determine a first acoustic state of the vehicle based on the plurality of audio signals; and a controller that is coupled to the adaptive noise classifier, wherein the controller is configured to:

receive status data indicative of one or more functional attributes of the vehicle;

determine, based on the first acoustic state of the vehicle and the status data, a second acoustic state of the vehicle, wherein the second acoustic state is an updated version of the first acoustic state; and control an operational state of each of a plurality of noise cancellation systems of the vehicle based on the second acoustic state of the vehicle;

wherein the adaptive noise classifier has a training phase and a deployment phase associated therewith, wherein during the training phase, the adaptive noise classifier is further configured to generate a plurality of model parameters based on a plurality of training signals, and wherein during the deployment phase, the adaptive noise classifier determines the first acoustic state of the vehicle based on the plurality of model parameters and the plurality of audio signals;

wherein during the training phase, the adaptive noise classifier is further configured to:

receive the plurality of training signals, with each training signal being indicative of an audio associated with the vehicle;

extract a first plurality of features from each training signal, wherein the first plurality of features comprise at least one of a group consisting of a time period, a measure of periodicity, a spectral envelope, one or more cepstral attributes, and one or more spectral band energy levels associated with the corresponding training signal; and process the first plurality of features of each training signal of the plurality of training signals to generate the plurality of model parameters.

10. The circuit of claim 9, wherein during the training phase, the adaptive noise classifier is further configured to (i) initialize the plurality of model parameters to a plurality of predefined values and (ii) update the plurality of model parameters in an iterative manner, wherein for each iteration, the adaptive noise classifier is further configured to (i) generate output data based on the plurality of model parameters and the first plurality of features of each training signal of the plurality of training signals and (ii) compare the output data with target data to determine an error associated with the plurality of model parameters, with the plurality of model parameters being updated based on the determined error, and wherein the training phase of the adaptive noise classifier is completed when the determined error is below a tolerance limit.

11. A circuit, comprising:

an adaptive noise classifier configured to receive a plurality of audio signals from a plurality of audio-capturing devices of a vehicle and determine a first acoustic state of the vehicle based on the plurality of audio signals; and a controller that is coupled to the adaptive noise classifier, wherein the controller is configured to:

receive status data indicative of one or more functional attributes of the vehicle;

determine, based on the first acoustic state of the vehicle and the status data, a second acoustic state of the vehicle, wherein the second acoustic state is an updated version of the first acoustic state; and control an operational state of each of a plurality of noise cancellation systems of the vehicle based on the second acoustic state of the vehicle;

wherein the adaptive noise classifier has a training phase and a deployment phase associated therewith, wherein during the training phase, the adaptive noise classifier is further configured to generate a plurality of model parameters based on a plurality of training signals, and wherein during the deployment phase, the adaptive noise classifier determines the first acoustic state of the vehicle based on the plurality of model parameters and the plurality of audio signals;

wherein during the deployment phase, the adaptive noise classifier is further configured to:

filter the plurality of audio signals received from the plurality of audio-capturing devices; and extract a second plurality of features from each audio signal of the plurality of audio signals, wherein the second plurality of features comprise at least one of a group consisting of a time period, a measure of periodicity, a spectral envelope, one or more cepstral attributes, and one or more spectral band energy levels associated with the corresponding audio signal, and wherein the first acoustic state of the vehicle is determined based on the second plurality of features of each audio signal of the plurality of audio signals and the plurality of model parameters.

12. The circuit of claim 11, wherein during the deployment phase, the plurality of model parameters are updated based on the one or more functional attributes of the vehicle.

13. The circuit of claim 12, wherein the controller is further configured to generate, based on the first acoustic state and the one or more functional attributes of the vehicle, feedback data indicative of the update of the plurality of model parameters and provide the feedback data to the adaptive noise classifier, and wherein the adaptive noise classifier is further configured to update the plurality of model parameters based on the feedback data.

14. A circuit, comprising:

an adaptive noise classifier configured to receive a plurality of audio signals from a plurality of audio-capturing devices of a vehicle and determine a first acoustic state of the vehicle based on the plurality of audio signals; and a controller that is coupled to the adaptive noise classifier, wherein the controller is configured to:

receive status data indicative of one or more functional attributes of the vehicle;

determine, based on the first acoustic state of the vehicle and the status data, a second acoustic state of the vehicle, wherein the second acoustic state is an updated version of the first acoustic state; and control an operational state of each of a plurality of noise cancellation systems of the vehicle based on the second acoustic state of the vehicle;

wherein the first acoustic state corresponds to one of a group consisting of (i) the vehicle moving with a plurality of windows thereof closed and (ii) the vehicle moving with one or more windows, of the plurality of windows, open, and wherein the second acoustic state corresponds to one of a group consisting of (i) the vehicle moving at a reference speed with the plurality of windows closed and presence of a voice activity therein, (ii) the vehicle moving at the reference speed with the plurality of windows closed and absence of the voice activity therein, (iii) the vehicle moving at the reference speed with the one or more windows open and the presence of the voice activity therein, and (iv) the vehicle moving at the reference speed with the one or more windows open and the absence of the voice activity therein;

wherein the plurality of noise cancellation systems comprise an engine noise cancellation system for an engine noise of the vehicle, a road noise cancellation system for a road-tire interaction noise of the vehicle, and an active noise cancellation system for one or more active noises in the vehicle that hamper the voice activity therein, and wherein each of the engine noise cancellation system, the road noise cancellation system, and the active noise cancellation system is controlled based on the second acoustic state.

15. The circuit of claim 14, wherein when the second acoustic state corresponds to the vehicle moving at the reference speed with the plurality of windows closed and the presence of the voice activity therein, (i) the engine noise cancellation system is deactivated, (ii) the road noise cancellation system is activated, and (iii) the active noise cancellation system is activated.

16. The circuit of claim 14, wherein when the second acoustic state corresponds to the vehicle moving at the reference speed with the plurality of windows closed and the absence of the voice activity therein, (i) the engine noise cancellation system is deactivated, (ii) the road noise cancellation system is activated, and (iii) the active noise cancellation system is deactivated.

17. The circuit of claim 14, wherein when the second acoustic state corresponds to the vehicle moving at the reference speed with the one or more windows open and the presence of the voice activity therein, (i) the engine noise cancellation system is deactivated, (ii) the road noise cancellation system is one of a group consisting of activated and deactivated, and (iii) the active noise cancellation system is deactivated.

18. The circuit of claim 14, wherein when the second acoustic state corresponds to the vehicle moving at the reference speed with the one or more windows open and the absence of the voice activity therein, (i) the engine noise cancellation system is deactivated, (ii) the road noise cancellation system is one of a group consisting of activated and deactivated, and (iii) the active noise cancellation system is deactivated.

19. A vehicle control method, comprising:

receiving, by an adaptive noise classifier, a plurality of audio signals from a plurality of audio-capturing devices of a vehicle;

determining, by the adaptive noise classifier, a first acoustic state of the vehicle based on the plurality of audio signals;

receiving, by a controller, status data indicative of one or more functional attributes of the vehicle;

determining, by the controller, based on the first acoustic state of the vehicle and the status data, a second acoustic state of the vehicle, wherein the second acoustic state is an updated version of the first acoustic state; and controlling, by the controller, an operational state of each of a plurality of noise cancellation systems of the vehicle based on the second acoustic state of the vehicle;

wherein the plurality of noise cancellation systems comprise an engine noise cancellation system for an engine noise of the vehicle, a road noise cancellation system for a road-tire interaction noise of the vehicle, and an active noise cancellation system for one or more active noises in the vehicle that hamper the voice activity therein, and wherein each of the engine noise cancellation system, the road noise cancellation system, and the active noise cancellation system is controlled based on the second acoustic state.

20. The vehicle control method of claim 19, wherein the one or more functional attributes of the vehicle comprise at least one of a group consisting of (i) a speed of the vehicle, (ii) a position of a plurality of windows of the vehicle, (iii) a status of a voice detector of the vehicle, (iv) a tire pressure of a plurality of tires of the vehicle, (v) a revolution count of an engine of the vehicle, and (vi) a status of a heating, ventilation, and air conditioning (HVAC) system of the vehicle.

* * * * *